United States Patent
Zheng et al.

(10) Patent No.: US 7,833,638 B2
(45) Date of Patent: Nov. 16, 2010

(54) GLASS MAT WITH INORGANIC COATING

(75) Inventors: Guodong Zheng, Englewood, CO (US); Jawed Asrar, Englewood, CO (US)

(73) Assignee: Johns Manville, Denver, CO (US)

( * ) Notice: Subject to any disclaimer, the term of this patent is extended or adjusted under 35 U.S.C. 154(b) by 253 days.

(21) Appl. No.: 11/900,849

(22) Filed: Sep. 13, 2007

(65) Prior Publication Data

US 2009/0155603 A1    Jun. 18, 2009

(51) Int. Cl.
*B32B 9/00* (2006.01)
(52) U.S. Cl. .................. 428/699; 428/432; 428/689; 428/697; 428/701; 428/702; 428/703
(58) Field of Classification Search .......... 428/428, 428/432, 689, 697, 701, 702, 703
See application file for complete search history.

(56) References Cited

U.S. PATENT DOCUMENTS

| | | | | |
|---|---|---|---|---|
| 3,002,857 A | * | 10/1961 | Stalego | 428/378 |
| 3,146,799 A | * | 9/1964 | Fekete | 428/34.2 |
| 4,163,351 A | * | 8/1979 | Ishikawa | 52/542 |
| 6,770,354 B2 | * | 8/2004 | Randall et al. | 428/219 |
| 2005/0214534 A1 | * | 9/2005 | Adamo et al. | 428/375 |

* cited by examiner

*Primary Examiner*—Gwendolyn Blackwell
(74) *Attorney, Agent, or Firm*—Robert D. Touslee

(57) ABSTRACT

Provided is a coated glass mat having enhanced flame and fire resistance properties. The glass mat comprises nonwoven glass fibers and a coating comprised of a silicate. The coated glass mat is particularly useful as a facer in the building industry.

15 Claims, No Drawings

GLASS MAT WITH INORGANIC COATING

BACKGROUND OF THE INVENTION

1. Field of the Invention

The present invention relates to mats, webs or facers coated with an inorganic coating. More specifically, the present invention relates to mats, webs or facers for the building construction industry, such as gypsum board, fiberglass facers and thermosetting polyisofoam insulation board facers coated with a silicate.

2. Description of the Related Art

Conventionally, organic binders such as a polymer latex are used in high solid coatings for fiberglass mats or other surfaces. It is well known to use latex coatings for a fiberglass mat facer in gypsum board application or other application such as polyisofoam insulation board facers. Inorganic binders such as sodium silicate (liquid glass) are believed to be too brittle in those applications. Silicates such as sodium silicate are also generally believed to be not usable in coatings exposed to hot and/or humid conditions for long period of time. See, for example, U.S. Pat. Nos. 6,770,354 and 5,112,678.

Liquid sodium silicates are solutions of water soluble glasses made from varied proportions of sand ($SiO_2$) and soda ash ($Na_2CO_3$). They range in viscosity from slightly sticky fluids to thick substances that resist flow. The more siliceous silicates (2.8 to 3.2 ratio) have long been used as dependable, low cost adhesives. Sodium silicate adhesives are used for bonding a variety of porous surfaces and materials such as paper, perlite, mica and wood.

Enhancing the flame resistance, fire resistance and mold resistance of materials in the building construction industry is always an important objective. Providing novel materials having such enhanced properties is an objective of the present invention.

SUMMARY OF THE INVENTION

Provided is a coated glass mat comprising a mat of glass fibers, either woven or nonwoven, and a coating comprised of a silicate, preferably an alkali metal silicate. Preferably, the coating also contains an additive which enhances the flexibility of the coated mat.

Among other factors, it has been found that silicate coatings are compatible with and suitable for mats of glass fibers. Their use in glass mat facers in the building industry, e.g., as a foam for gypsum wallboard or polyisofoam insulation boards or ceiling tiles, provides a building product with enhanced fire and flame resistance. Cost advantages in the production of such facers can also be realized as compared to using conventional organic coatings.

DETAILED DESCRIPTION OF THE PREFERRED EMBODIMENTS

Silicate binders are provided for glass mats. The binder can be used for glass mats having a low solids coating or a high solids coating formulation. A high solids coating formulation is at least 65 weight percent based on the weight of the glass mat. In a preferred embodiment, the silicate binders are used in glass mats with a high solids coating.

The silicate coated fiberglass mat has important advantages over organic coatings in anti-flame, anti-mold properties and offers significant cost savings. The coated glass fiber facer is suitable as a facer for a ceiling tile with a polyisocyanurate foam base. The polyisocyanurate foam faced by sodium silicate coated mat provides a great improvement in fire-resistance. For gypsum board applications, the silicate coating formulation modified with an additive such as polyol, sorbitol, sugar, glycerin, etc. exhibits the necessary degree of flexibility and works well as a facer. Latex with an anionic or non-ionic surfactant, such as those available under the tradename Duracet, Airflex and Goodrite, which are compatible with sodium silicate, can be added to the coating in a minor percentage. The addition will improve coating flexibility and bond strength of coating.

The silicates of the present invention can be referred to as liquid glass. Liquid glass is a silicate with inorganic or organic counter ions. Inorganic counter ions are K, Na, and Li and organic counter ions are quaternary amines such as tetramethylammonium, monomethyltriethanolammonium, isopropyltriethanolammonium and tetraethanolammonium and organic amine cation such as methylamine, ethylamine, ethanolamine, diethanolamine, and triethanolamine in the protonated form. By using liquid glass, i.e., the silicates of the present invention, as a binder in a glass mat coating formulation, the organic dispersing agent typically used can be reduced or eliminated. This is of a great benefit in regard to cost reduction, and improved fire resistance and mold resistance.

The coating formulation of a silicate with different modifiers can be processed and cured in any conventional manner such as roll coating/heating oven. Importantly, the coating formulation also can be cured at room temperature by spraying mineral acid, organic acid, acidic salts or heavy metal salts such a $CaCl_2$, $MgSO_4$, $Al_2(SO_4)_3$, $ZnSO_4$ $AlPO_4$ on the coating surface. This curing process will save significant energy and will also greatly simplify the production line. Consequently, a significant cost savings in investment will be realized.

Liquid sodium silicates are solutions of glasses which are made by fusing varying proportions of sand ($SiO_2$) and soda ash ($Na_2CO_3$). These proportions are usually defined by the specific product's $SiO_2/Na_2O$ weight ratio. Commercial products are available from the PQ Corporation under the designation Stixso N and O. Commercial liquid potassium silicates in several $SiO_2/K_2O$ weight ratios are also available from the PQ Corporation under the trademark KASIL®. The potassium silicates are similar to sodium silicate but have properties that are better suited to some applications, e.g., when greater electrical resistance is required. Organic amine or quaternary amine (methylamine, ethylamine, ethanolamine, diethanolamine, triethanolamine, tetramethylammonium, monomethyltriethanolammonium, isopropyltriethanolammonium, and tetraethanolammonium) silicates provide similar binding performance with a flexibility advantage. Although the cost of organic amine or quaternary amine silicates is higher than that of sodium or potassium silicate, the inherent flexibility from this type of silicate may be able to eliminate the addition of a plasticizer in the coating formulation. The inorganic silicates, however, are preferred due to better fire resistance properties.

Flexibility increases in lower-ratio silicates because of their tendency to hold onto water more tenaciously than higher ratio silicates and thus have some degree of internal plasticization of the film by the residual water. Because the low-ratio silicates tend to retain more water, they are less brittle than the higher ratio silicates.

For relatively insoluble bonds or films, liquid sodium and potassium silicates can be reacted with a variety of acidic or soluble metal compounds. Neutralizing an alkali silicate with acidic materials polymerizes the silica and forms a gel. Chemical setting agents that can be used in this manner include: mineral and organic acids, carbon dioxide ($CO_2$) gas, and acid salts such as sodium bicarbonate and monosodium phosphate ($NaH_2PO_4$).

Multivalent metal compounds react with silicate solutions to form coatings or bonds by precipitation of insoluble metal silicate compounds. Chemical setting reactions generally occur rapidly, and these materials frequently are applied as an after-treatment. Calcium chloride, magnesium sulfate, aluminum sulfate, borax, and sodium metaborate used in this manner are generally applied as 5 to 10% solutions. Chemical setting agents that dissolve slowly in water, such as finely divided zinc oxide or sodium silico fluoride, can be used for silicate binders or coatings that exhibit longer working lives. These agents usually are used at a level of approximately 7% by weight based on the weight of liquid silicate. Silico fluoride is particularly effective for ambient temperature curing procedures.

Some chemical setting agents will only react with the silicate at elevated temperatures. Kaolinitic clays and minerals, which decompose at 400 to 500° F. into acidic compounds, are examples of this type of setting agent. Coating formulations containing a certain percentage of kaolinitic clay, such as Dixie clay, would improve the degree of curing. Consequently, the coating would improve water resistance. At the same curing temperature, the curing time, which is directly related to productivity and energy cost, can be reduced in the presence of a kaolinitic clay.

Silicate coatings or adhesives alone generally are not suitable where a high degree of flexibility is required. However, a moderate degree of flexibility is obtained by the addition of plasticizers to the silicate solution. Typically, 1 to 5% by weight of sugar, glycerine or other polyhydric alcohols are used. Up to 30% of sorbitol can be used, provided the silicate solution is diluted to avoid excessive thickening. Rubber latices can also be employed as plasticizers. Incorporation of finely ground clays and similar fillers will improve flexibility to some extent.

In summary, the present invention relates to a glass mat coated with a coating composition comprised of water, filler and a silicate binder. In general, the amount of silicate binder in the coating composition ranges from about 4% to 12% based on the total dry weight of the coating. Preferably, the amount of silicate binder ranges from 6 to 9%. A latex of organic plasticizer can be added to the composition to aid in flexibility, if desired. The amount of plasticizer in dry weight can range from 1 to 30% by weight based on dry weight of the silicate, more preferably from 5 to 30%, and most preferably from 10 to 20% by weight. The filler is generally an inorganic material, such as kaolinitic clay, mica, talc, limestone (calcium carbonate), fly ash, gypsum (calcium sulfate), montmorillonite, smectite and chlorite. A filler such as mica is preferred when permeability of the system is to be reduced. The platelet structure of the mica helps to cover the holes and thereby reduce permeability.

Organic and polymeric latexes can be added as well, generally anionic or non-ionic. The polymer latexes can be polyacrylic, polyvinyl acetate, polyethylene-vinyl acetate, polyethylene-vinyl chloride, polyvinyl chloride, SBR, polystyrene acrylic, polyvinyl acrylic polyurethane, and acetate-ethylene-acrylate terpolymer anionic or non-ionic surfactants. Organic plasticizers include polyol, polyethylene glycol, sugar, diethylene glycol, glycerin and sorbitol. The binder can be cured by thermo-curing, catalyzed curing and thermo-catalyzed curing. The catalysts for curing can include aqueous solutions of an inorganic acid, organic acid, acidic salt, alkaline earth metal salt, and a transition metal salt.

The coating can be applied by any conventional manner. In a preferred embodiment, however, a method of impregnating glass mat with the solid silicate slurry having a controlled porosity has been established. Glass mat passes over the surface of a solid slurry to pre-wet the mat by touching the glass mat on the bottom side. When the slurry impregnates the mat from the bottom side of the glass mat, air in the glass mat will be pushed up and the slurry will fully wet the glass mat. Then the pre-wet glass mat is immersed into the slurry to get further saturated. The saturated glass mat can be dried by IR heaters or in an oven. If a higher weight or lower porosity is required, a second impregnation can be applied.

In certain preferred embodiments:

1. The inorganic binders include alkali metal silicates such as sodium silicate and potassium silicate, and their use in formulation of high solid coating fiberglass mats for application to polyiso foam, ceiling tiles and gypsum boards.

2. The inorganic binders can be modified by adding an organic plasticizer or latex to gain certain flexibility, and thus meet required physical properties.

3. The coating of an inorganic binder can be processed and cured in a conventional manner, or the coating could also be cured at room temperature by spraying heavy metal salts.

Certain principles and advantages which can be associated with the present invention will now be further described by reference to specific embodiments in the following examples. It should be understood that these examples are illustrative of the principles of the present invention and not necessarily limiting in the scope thereof.

Example 1

An 8,000 pound batch of coating mixture is made by adding 1296 pounds of water to a mixing tank mounted with heavy duty disperser, followed by 959 lbs 3.2 modulus sodium silicate (38% solid) and 149 lbs polyvinylacrylate latex Duracet 864 (50% solid); 2.5 lbs defoamer and 30 lbs water repellant of Sequapel 409. The mixture is very well mixed and followed by adding 3240 lbs of White 10 and 2323 lbs Atomite. The well mixed coating has 75% solid content and 5:1 ratio of solium silicate to polymer and 12.7:1 ratio of filler to dry binder. The coating can be cured by heating to a certain degree of dryness or by spraying thereon a solution of catalyst.

A fiberglass mat is coated with the mixture and tested. The results are shown in Table 1 below.

TABLE 1

| Fiberglass mat coated with Example 1 coating ||||
|---|---|---|---|
| Coating Weight | Gurley Number | Curing Condition | Stability to 12 hrs water immersion |
| 222 g | 6.5 s | 205° C./3 min | Good |
| 258 | 53 s | 205° C./3 min | Good |
| 248 | 50 s | 15% $CaCl_2$ spray | Good |
| 384 | 80 s | 15% $CaCl_2$ spray | Good |

Example 2

In the coating of Example 1,106 lbs (70% solids) of an organic compound sorbitol is used to replace the 149 lbs. of polyvinylacrylate latex. A suitable coating was obtained.

Example 3

An 8,000 pound batch of coating mixture is made by adding 1296 pounds of water to a mixing tank mounted with heavy duty disperser; followed by 959 lbs 3.2 modulus sodium silicate (38% solid) and 149 lbs polyethelevinylacetate (PEVA) latex EF 911 (50% solid); 2.5 lbs defoamer and 30 lbs water repellant of Sequapel 409. The mixture is very well mixed and followed by adding 3894 lbs of White 10 and 1669 lbs Atomite. The well mixed coating has 75% solid content and 5:1 ratio of sodium silicate to polymer and 12.7:1 ratio of filler to dry binder. The coating can be cured by heating to a certain degree of dryness or by spraying thereon a solution of catalyst.

Example 4

1669 lbs of Dixie clay was used to replace the 1669 lbs of Atomite in the composition of Example 3. A suitable coating was obtained.

Example 5

A glass mat coated with the silicate formulation of Example 1 was compared to a commercial coated glass mat. The results are shown in Table 2 below:

TABLE 2

Polyisocyanurate foam of roof deck with coated glass mat (Example 1 formulation)

| Property Measured | Control of commercial coated glass mat with organic latex coating | Coated glass mat with Example 1 formulation |
|---|---|---|
| Coat Weight - max (gsm) | 500 | 460 |
| Compressive Strength (psi) | 112 | 139 |
| Flexural Load MD (lbs) | 35 | 43 |
| Flexural Strength MD (psi) | 2486 | 3085 |
| Flexural Load CMD (lbs) | 39 | 40 |
| Flexural Strength CMD (psi) | 2804 | 2883 |
| Alkali Resistance (pass/fail) | Pass | Pass |
| Glass Mat | 7512 | 7512 |

As can be seen from the foregoing table, the performance characteristics of the silicate coated mat, including flexibility, are comparable to that of the latex-containing commercial mat. Yet, the silicate coated mat has much better fire and mold resistance.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A laminate comprised of a first layer and a second layer, with the first layer being selected from the group consisting of a gypsum board, an insulation wallboard, a polyisocyanurate foam board, and a ceiling tile, and the second layer being a glass mat, which is comprised of glass fibers and a coating comprised of a silicate binder, and with the coating having been cured by spraying with heavy metal salts.

2. The laminate of claim 1, wherein the silicate is an inorganic or organic silicate.

3. The laminate of claim 1, wherein the silicate is an inorganic silicate selected from the group of potassium silicate, sodium silicate or lithium silicate.

4. The laminate of claim 1, wherein the silicate is an organic silicate selected from tetramethylammonium silicate, monomethyltriethanolammonium silicate, isopropyltriethanolammonium silicate, tetraethanolammonium silicate, methylamine silicate, ethylamine silicate, ethanolamine silicate, diethanolamine silicate, or triethanolamine silicate.

5. The laminate of claim 1, wherein the coating further comprises a filler selected from the group consisting of kaolinite, mica, talc, limestone (calcium carbonate), fly ash, gypsum (calcium sulfate), montmorillonite, smectite, and chlorite.

6. The laminate of claim 1, further comprising polymeric fibers in combination with the glass fibers.

7. The laminate of claim 1, wherein the amount of silicate binder in the coating ranges from about 4 to 12 weight % based on the total dry weight of the coating.

8. The laminate of claim 7, wherein the amount of silicate ranges from about 6 to 9 weight %.

9. The laminate of claim 1, wherein the coating further comprises an additive which enhances flexibility.

10. The laminate of claim 9, wherein the additive comprises a latex or organic plasticizer.

11. The laminate of claim 10, wherein the amount of plasticizer present ranges from about 5 to 30 wt % based on the dry weight of silicate.

12. The laminate of claim 11, wherein the amount of plasticizer present ranges from about 10 to 20 wt %.

13. The laminate of claim 10, wherein the additive is a polyol, sorbitol, sugar, glycerine, or a latex of an anionic or non-ionic surfactant.

14. The laminate of claim 10, wherein the latex is selected from the group of polyacrylic, polyvinyl acetate, polyethylene-vinyl acetate, polyethylene-vinyl chloride, polyvinyl chloride, SBR, polystyrene acrylic, polyvinyl acrylic polyurethane, and acetate-ethylene-acrylate terpolymer surfactants.

15. The laminate of claim 10, wherein the organic plasticizer is polyol, polyethylene glycol, sugar, diethylene glycol, gylcerin, or sorbitol.

* * * * *